US008924981B1

(12) United States Patent
Brown et al.

(10) Patent No.: US 8,924,981 B1
(45) Date of Patent: Dec. 30, 2014

(54) CALCULATING PRIORITY INDICATORS FOR REQUESTS IN A QUEUE

(75) Inventors: Douglas P. Brown, Rancho Santa Fe, CA (US); Thomas P. Julien, San Diego, CA (US); Louis M. Burger, Escondido, CA (US); Anita Richards, San Juan Capistrano, CA (US)

(73) Assignee: Teradat US, Inc., Dayton, OH (US)

( * ) Notice: Subject to any disclaimer, the term of this patent is extended or adjusted under 35 U.S.C. 154(b) by 1078 days.

(21) Appl. No.: 12/945,064

(22) Filed: Nov. 12, 2010

(51) Int. Cl.
G06F 9/46 (2006.01)
G06F 15/173 (2006.01)
G06F 7/00 (2006.01)

(52) U.S. Cl.
USPC ........... 718/103; 718/102; 718/104; 709/225; 709/226; 707/713

(58) Field of Classification Search
None
See application file for complete search history.

(56) References Cited

U.S. PATENT DOCUMENTS

| | | | |
|---|---|---|---|
| 3,648,253 A | 3/1972 | Mullery et al. | |
| 5,301,317 A | 4/1994 | Lohman et al. | |
| 5,473,773 A | 12/1995 | Aman | |
| 5,504,894 A | 4/1996 | Ferguson et al. | |
| 5,537,542 A | 7/1996 | Eilert | |
| 5,675,739 A | 10/1997 | Eilert et al. | |
| 5,675,797 A | 10/1997 | Chung | |
| 5,692,182 A * | 11/1997 | Desai et al. | 1/1 |
| 6,052,694 A | 4/2000 | Bromberg | |
| 6,330,552 B1 | 12/2001 | Farrar et al. | |
| 6,353,818 B1 | 3/2002 | Carino, Jr. | |
| 6,584,488 B1 | 6/2003 | Brenner et al. | |
| 6,718,358 B1 | 4/2004 | Bigus | |
| 6,779,182 B1 * | 8/2004 | Zolnowsky | 718/103 |
| 6,895,585 B2 | 5/2005 | Smith | |
| 6,950,848 B1 | 9/2005 | Yousefi'zadeh | |
| 6,957,433 B2 | 10/2005 | Umberger et al. | |
| 6,990,667 B2 | 1/2006 | Ulrich et al. | |
| 7,124,146 B2 | 10/2006 | Rjaibi et al. | |
| 7,146,353 B2 | 12/2006 | Garg | |
| 7,228,546 B1 | 6/2007 | McCarthy | |
| 7,360,218 B2 * | 4/2008 | Accapadi et al. | 718/102 |
| 7,379,953 B2 | 5/2008 | Luo et al. | |
| 7,395,537 B1 | 7/2008 | Brown | |
| 7,499,908 B2 | 3/2009 | Elnaffar et al. | |
| 7,657,501 B1 | 2/2010 | Brown | |
| 7,774,312 B2 | 8/2010 | Ngai et al. | |
| 7,802,255 B2 * | 9/2010 | Pilkington | 718/102 |
| 7,805,727 B2 * | 9/2010 | Anderson et al. | 718/107 |
| 7,818,745 B2 | 10/2010 | Snyder | |
| 7,831,592 B2 | 11/2010 | Markl et al. | |

(Continued)

OTHER PUBLICATIONS

Beyer et al., "Protecting the Quality of Service of Existing Information Systems", Computer Sciences Department, University of Wisconsin, 2003, pp. 1-10.

(Continued)

*Primary Examiner* — Abdullah Al Kawsar
(74) *Attorney, Agent, or Firm* — Trop, Pruner & Hu, P.C.

(57) ABSTRACT

Requests to be executed in the database system are received, where a plurality of the requests are provided in a queue for later execution. Priority indicators are calculated for assignment to corresponding ones of the plurality of requests in the queue, where the priority indicators are calculated based on delay times and predefined priority levels of the requests. The requests in the queue are executed in order according to the calculated priority indicators.

17 Claims, 3 Drawing Sheets

(56) References Cited

U.S. PATENT DOCUMENTS

| | | | |
|---|---|---|---|
| 7,853,584 B2 | 12/2010 | Barsness et al. | |
| 8,032,885 B2* | 10/2011 | Fish | 718/101 |
| 8,151,269 B1 | 4/2012 | Brown et al. | |
| 8,261,283 B2* | 9/2012 | Tsafrir et al. | 718/107 |
| 8,332,857 B1 | 12/2012 | Brown et al. | |
| 8,516,488 B1 | 8/2013 | Brown et al. | |
| 8,539,493 B1* | 9/2013 | Robertson et al. | 718/103 |
| 8,627,319 B1* | 1/2014 | Xu | 718/102 |
| 8,645,425 B1* | 2/2014 | Brown et al. | 707/788 |
| 2001/0039559 A1 | 11/2001 | Eilert et al. | |
| 2002/0091746 A1 | 7/2002 | Umberger et al. | |
| 2002/0143847 A1 | 10/2002 | Smith | |
| 2002/0184240 A1 | 12/2002 | Volkoff et al. | |
| 2003/0002649 A1 | 1/2003 | Hettish | |
| 2003/0005028 A1 | 1/2003 | Dritschler | |
| 2003/0051026 A1* | 3/2003 | Carter et al. | 709/224 |
| 2003/0097443 A1 | 5/2003 | Gillett et al. | |
| 2003/0233391 A1 | 12/2003 | Crawford, Jr. | |
| 2004/0021678 A1 | 2/2004 | Ullah | |
| 2004/0158831 A1* | 8/2004 | Amano et al. | 718/100 |
| 2004/0205206 A1 | 10/2004 | Naik et al. | |
| 2004/0225631 A1 | 11/2004 | Elnaffar | |
| 2004/0236757 A1 | 11/2004 | Caccavale | |
| 2004/0243692 A1 | 12/2004 | Arnold | |
| 2005/0038789 A1 | 2/2005 | Chidambaran | |
| 2005/0038833 A1 | 2/2005 | Colrain | |
| 2005/0039183 A1 | 2/2005 | Romero | |
| 2005/0066326 A1 | 3/2005 | Herbeck | |
| 2005/0071307 A1 | 3/2005 | Snyder | |
| 2005/0081210 A1 | 4/2005 | Day et al. | |
| 2005/0108717 A1 | 5/2005 | Hong et al. | |
| 2005/0125213 A1 | 6/2005 | Chen | |
| 2005/0192937 A1 | 9/2005 | Barsness et al. | |
| 2005/0262183 A1 | 11/2005 | Colrain | |
| 2005/0278381 A1 | 12/2005 | Diao et al. | |
| 2005/0283783 A1* | 12/2005 | DeSota | 718/100 |
| 2006/0026179 A1 | 2/2006 | Brown | |
| 2006/0080285 A1 | 4/2006 | Chowdhuri | |
| 2006/0149695 A1 | 7/2006 | Bossman et al. | |
| 2007/0100793 A1 | 5/2007 | Brown | |
| 2007/0162426 A1 | 7/2007 | Brown | |
| 2007/0271570 A1 | 11/2007 | Brown et al. | |
| 2008/0010240 A1 | 1/2008 | Zait | |
| 2008/0052720 A1 | 2/2008 | Barsness et al. | |
| 2008/0071759 A1 | 3/2008 | Santosuosso | |
| 2008/0133447 A1 | 6/2008 | Barsness et al. | |
| 2008/0133454 A1 | 6/2008 | Markl et al. | |
| 2008/0162417 A1 | 7/2008 | Morris | |
| 2008/0162418 A1 | 7/2008 | Morris | |
| 2008/0162419 A1 | 7/2008 | Brown | |
| 2008/0162583 A1 | 7/2008 | Brown | |
| 2008/0172419 A1 | 7/2008 | Richards | |
| 2008/0244592 A1* | 10/2008 | Uchihira | 718/103 |
| 2008/0306950 A1 | 12/2008 | Richards et al. | |
| 2009/0183162 A1* | 7/2009 | Kindel et al. | 718/103 |
| 2009/0328040 A1* | 12/2009 | Miller et al. | 718/100 |
| 2010/0125565 A1* | 5/2010 | Burger et al. | 707/713 |
| 2010/0242050 A1* | 9/2010 | Chan | 718/108 |
| 2010/0281285 A1 | 11/2010 | Blanding | |
| 2011/0270822 A1 | 11/2011 | Denton et al. | |
| 2012/0047158 A1* | 2/2012 | Lee et al. | 707/759 |
| 2012/0054175 A1 | 3/2012 | Barsness et al. | |
| 2012/0054756 A1* | 3/2012 | Arnold et al. | 718/102 |

OTHER PUBLICATIONS

Nikolaou et al., "Transaction Routing for Distributed OLTP Systems: Survey and Recent Results", Department of Computer Science, University of Crete and Institute of Computer Science, 2002, pp. 1-26.

Sinnwell et al., "Managing Distributed Memory to Meet Multiclass Workload Response Time Goals", Department of Computer Science, University of the Saarland, 2002, pp. 1-8.

Oracle, "ORACLE91 Database Resoruce Manager", Technical Whitepaper, 2001, pp. 1-11.

Finkelstein, Computer Science Department, Stanford University, "Common Expression Analysis in Database Applications," 1982, pp. 235-245.

Sellis, University of California, Berkeley, "Multiple-Query Optimization," ACM Transactions on Database Systems, vol. 13, No. 1, Mar. 1988, pp. 23-52.

Brown et al., U.S. Appl. No. 12/317,836 entitled "Database System Having a Service Level Goal Responsive Regulator" filed Dec. 30, 2008 (24 pages).

Brown et al., U.S. Appl. No. 12/317,985 entitled "Database System Having Regulator That Performs Workload Regulation Based on Optimizer Estimates" filed Dec. 30, 2008 (26 pages).

Brown et al., U.S. Appl. No. 12/482,780 entitled "Database System Having a Regulator to Provide Feedback Statistics to an Optimizer" filed Jun. 11, 2009 (33 pages).

Burger et al., U.S. Appl. No. 12/908,052 entitled "Generating an Integrated Execution Plan for Multiple Database Requests" filed Oct. 20, 2010 (34 pages).

Brown et al., U.S. Appl. No. 12/942,466 entitled "Adjusting a Resource Estimate in Response to Progress of Execution of a Request" filed Nov. 9, 2010 (36 pages).

Richards et al., U.S. Appl. No. 12/942,480 entitled "Managing Execution of Requests Using Information Relating to a Job" filed Nov. 9, 2010 (42 pages).

Richards et al., U.S. Appl. No. 12/945,072 entitled "Calculating a Throttle Limit for Requests in a Database System" filed Nov. 12, 2010 (44 pages).

Brown, Douglas R., et al., U.S. Appl. No. 12/952,561 entitled Rejecting a Request in a Database System filed Nov. 23, 2010 (37 pages).

Richards, Anita et al., U.S. Appl. No. 12/942,480 entitled Managing Execution of Requests Using Information Relating to a Job filed Nov. 9, 2010 (42 pages).

\* cited by examiner

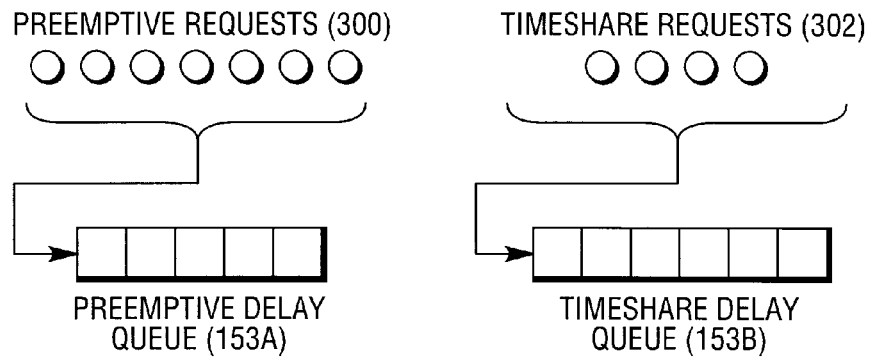
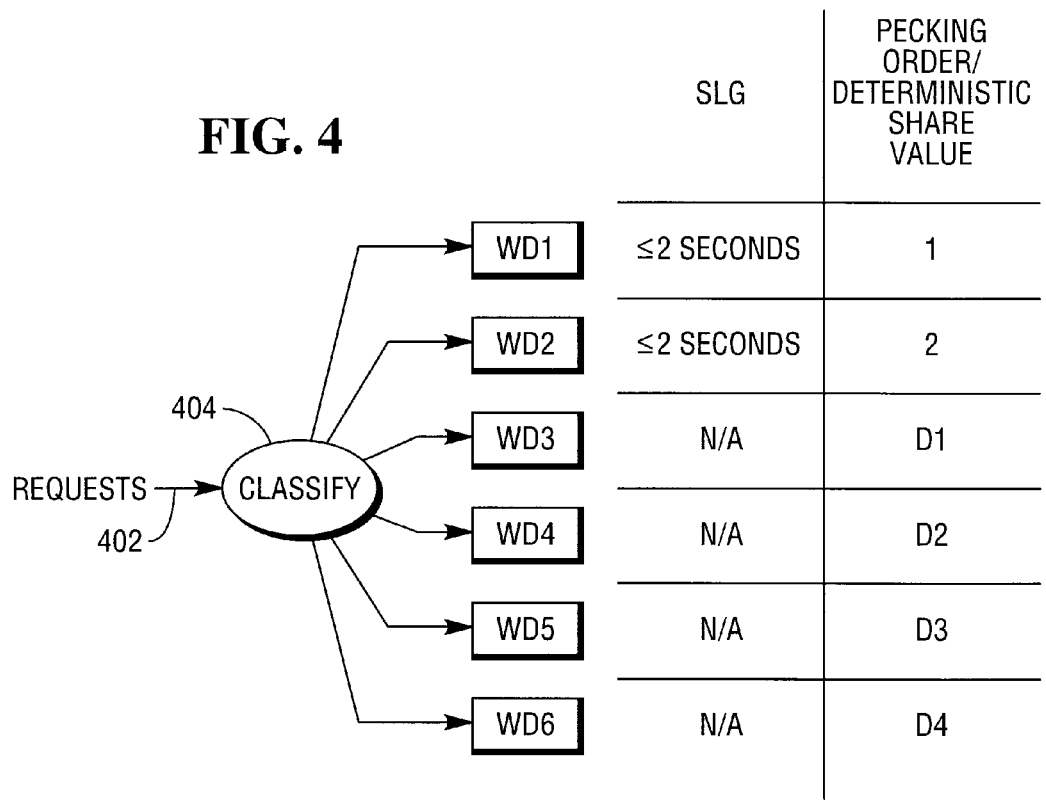

CALCULATING PRIORITY INDICATORS FOR REQUESTS IN A QUEUE

BACKGROUND

A database is a collection of logically related data arranged in a predetermined format, such as in tables that contain rows and columns. To access the content of a table in the database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

As database systems have increased in size and complexity, it has become more challenging to efficiently implement operational and management tasks in the database systems.

SUMMARY

In general, requests to be executed in the database system are received, where a plurality of the requests are provided in a queue for later execution. Priority indicators are calculated for assignment to corresponding ones of the plurality of requests in the queue, where the priority indicators are calculated based on delay times and predefined priority levels of the requests. The requests in the queue are executed in order according to the calculated priority indicators.

Other or alternative features will become apparent from the following description, from the drawings, and from the claims.

BRIEF DESCRIPTION OF THE DRAWINGS

Some embodiments are described with respect to the following figures:

FIG. 3 illustrates delay queues for different classes of requests, in accordance with some embodiments; and FIG. 4 illustrates classification of requests to workload groups, where the workload groups are associated with respective service level goals (if any) and priority levels.

DETAILED DESCRIPTION

Figure 1:
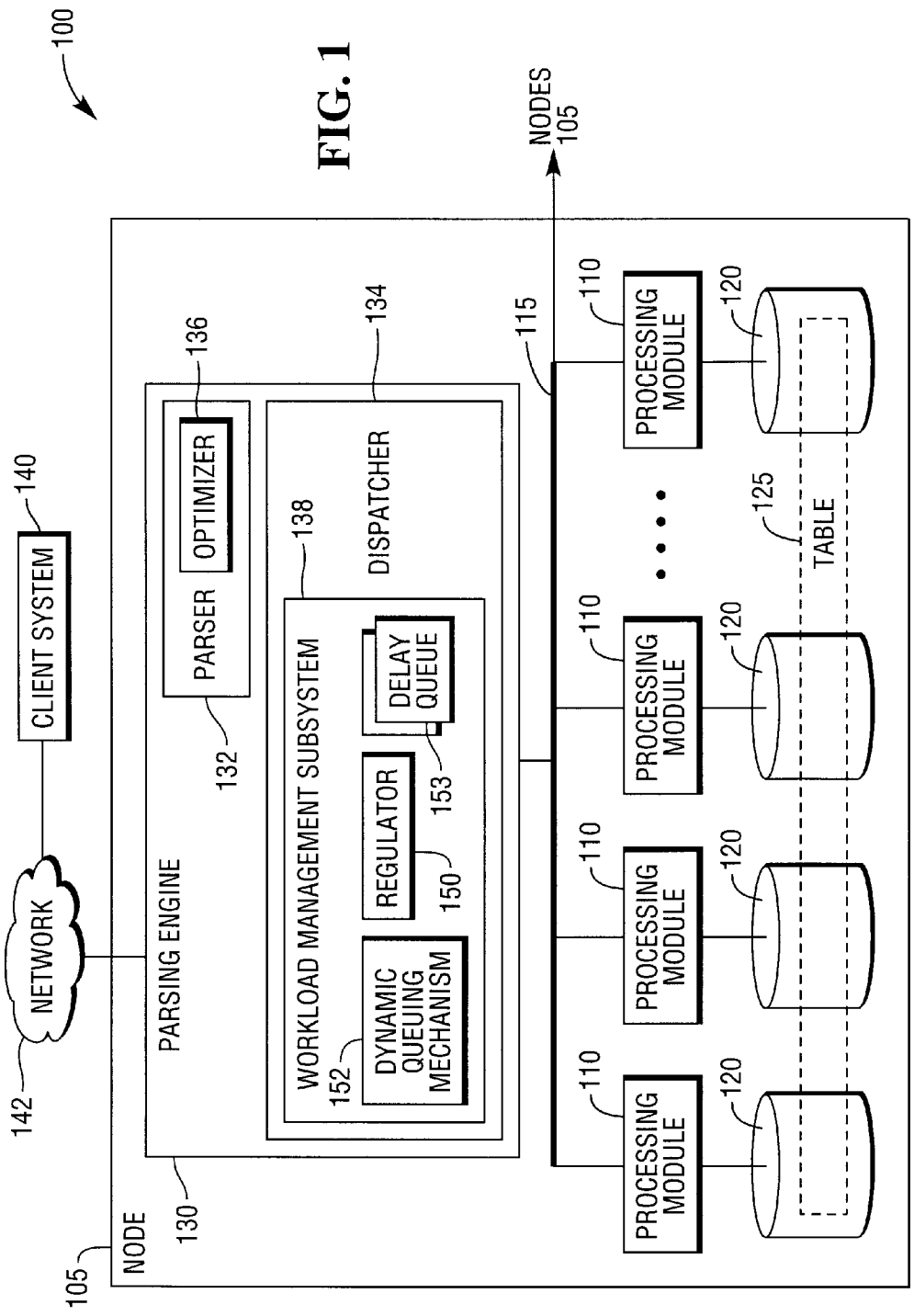
FIG. 1 is a block diagram of an example database system including a workload management subsystem in accordance with some embodiments.

A workload management subsystem according to some embodiments provides for more effective concurrency control of request execution in a database management system (or more simply "database system"). The workload management subsystem includes a regulator and a dynamic queuing mechanism. The regulator is able to regulate execution of the requests such that respective performance goals of the requests can be achieved, while the dynamic queuing mechanism is able to determine whether any given request can be immediately scheduled for execution or whether the given request should be held for later execution.

The term "request" or "database request" can refer to a database query (e.g., Structured Query Language or SQL query) that is processed by the database system to produce an output result. Alternatively, a "request" or "database request" can refer to a utility, such as a load utility to perform loading of data from a source to a target. More generally, a "request" or "database request" refers to any command or group of commands that can be submitted to the database system for performing predefined data access (read or write) tasks, or to perform creation or modifications of database structures such as tables, views, etc. A request can belong to one of multiple possible workloads in the database system.

A "workload" (or alternatively "workload group") is a set of requests that have common characteristics, such as an application that issued the requests, a source of the requests, type of query, priority, response time goals, throughput, and so forth. A workload group is defined by a workload definition, which defines characteristics of the workload group as well as various rules associated with the workload group. A "multi-class workload" is an environment with more than one workload.

The workload groups may be divided into workload groups of different priorities. A low priority workload group may include low priority requests such as background load requests or reporting requests. Another type of workload group includes requests that have short durations but high priorities. Yet another type of workload group includes continuous or batch requests, which run for a relatively long time.

In some database systems, concurrency limits can be set to limit the number of concurrent requests that are executing inside the database systems. Limiting the number of concurrent requests that can execute in a database system based on concurrency limits is referred to as throttling. In performing throttling, different concurrency limits can be specified for respective different workload groups. Thus, the number of concurrent requests for each workload group can be monitored, and if an incoming request (of a particular workload group) would cause a respective concurrency limit to be exceeded, then the incoming request can be provided to a delay queue for later execution. Providing or storing a request in the delay queue refers to storing either the entire request in the delay queue, a portion of the request in the delay queue, or a representation of the request in the delay queue.

There are various issues associated with using throttling techniques based on concurrency limits for different workload groups. The different concurrency limits may have to be set by a database administrator, which can be difficult to accurately set without a lot of trial and error, and continual manual monitoring of database system operations. Moreover, requests provided in a delay queue typically use a simple first-in-first-out (FIFO) scheduling technique to determine which delayed request is to be executed next. Although the FIFO scheduling technique promotes a basic fairness principle, strict adherence to the FIFO scheduling technique can cause certain requests in the delay queue to violate respective service level goals (SLGs) of the requests.

An "SLG" or "service level goal" refers to a predefined set of one or more performance criteria that are to be satisfied during execution of a request. The SLG can be defined by a database administrator, for example. In some examples, an SLG can be any one or more of the following: a target response time; a target throughput; an enforcement policy (to specify that some percentage of queries are to finish in some predefined amount of time), and so forth. In a more specific example, the SLG for requests of a particular workload group can be "≤1 second @ 95," which means that each such request should execute within one second 95% of the time. Another example SLG can be "1,000 queries per hour."

An SLG can be defined for a request individually. Alternatively, an SLG can be defined for a workload group that has a number of requests.

A further limitation of typical delay queue scheduling techniques is that they fail to consider what "like" requests can be scheduled together to enhance resource sharing. For example, two requests in the delay queue can substantially share resources of a database system during execution, where one of the two requests is the next request scheduled for execution, whereas the second of the two requests can be farther back in the delay queue. If the second request is not executed concurrently with the first request, then an opportunity for sharing of database system resources is lost. For enhanced efficiency, it may be beneficial to schedule these two requests together for execution so that substantial resource sharing can be achieved.

In accordance with some embodiments, a dynamic queuing mechanism is provided to more efficiently manage execution of requests provided in a delay queue of the workload management subsystem. An example of a workload management subsystem is depicted in FIG. 1, which depicts an example database system 100 that has a parsing engine 130 including a workload management subsystem 138. The workload management subsystem 138 includes a dynamic queuing mechanism 152 according to some embodiments, as well as a regulator 150 (discussed further below). The workload management subsystem 138 also includes one or multiple delay queues 153 for storing requests that cannot be immediately scheduled for execution in the database system 100.

In accordance with some embodiments, rather than use a simple FIFO scheduling technique for determining which request in the delay queue 153 to next execute, the selection of the next request in the delay queue 153 for execution is based on priority indicators calculated for respective requests in the delay queue 153. The priority indicators calculated for the requests in the delay queue 153 can be based on delay times and predefined priority levels set for respective requests in the delay queue 153.

A "delay time" of a request in the delay queue 153 includes the amount of time that the respective request has spent in the delay queue 153 waiting for execution. The predefined priority level for a particular request refers to some pre-assigned priority level of the particular request. For example, the predefined priority level can be based on the SLG of the request (if the request has an SLG). Alternatively, or additionally, the predefined priority level can be a user-assigned "pecking order," which can be assigned by a user to specify an order of priority for the particular request. In some implementations, a pecking order and/or SLG can be provided for a first class of requests, referred to as preemptive requests in some examples (discussed further below).

For a second class of requests, referred to as timeshare requests in some examples, the predefined priority level can be a deterministic value that is assigned (either automatically or manually) to a particular request of the second class to control a respective share of database system resources that can be used by the particular request during execution. A timeshare request is a request that shares database system resources with other timeshare requests. This second class of timeshare requests are not associated with SLGs. The database system resources that can be shared by timeshare requests are those database system resources that are not used by preemptive requests. Generally, preemptive requests have higher priority than timeshare requests such that the timeshare requests will not receive any resources that are needed by preemptive requests. Stated differently, preemptive requests will preempt resources away from timeshare requests if necessary to meet the SLGs of the preemptive requests.

The distinction between preemptive requests and timeshare requests allows for more flexible management of requests executing in the database system 100. Not all requests require an SLG. Rather than using SLGs to manage execution of timeshare requests, the deterministic values mentioned above can be assigned to timeshare requests to control relative sharing of database system resources by the timeshare requests. The deterministic values indicate the relative importance of the corresponding timeshare requests, and thus the relative amounts of database system resources that can be used by the respective timeshare requests in a shared manner.

In some implementations, the delay queues 153 depicted in FIG. 1 can include a first delay queue for preemptive requests and a second delay queue for timeshare requests. For example, FIG. 3 shows a preemptive delay queue 153A and a timeshare delay queue 153B for receiving preemptive requests (300) and timeshare requests (302), respectively. As noted above, the requests in each of the preemptive delay queue 153A and the timeshare delay queue 153B are sorted based on calculated priority indicators.

In alternative implementations, the same delay queue can be used for both preemptive and timeshare requests. Although reference is made to preemptive requests and timeshare requests in the discussion herein, it is noted that techniques and mechanisms according to some embodiments can be applied to other classes of requests.

In some implementations, the database system 100 can include multiple computer nodes 105 (just one node depicted in FIG. 1). Each node 105 includes one or more processing modules 110 connected to a network 115. The processing modules 110 manage the storage and retrieval of data in respective data storage facilities 120. Each of the processing modules 110 may be one or more physical processors or may be a virtual processor, with one or more virtual processors running on one or more physical processors.

Each processing module 110 manages a portion of a database that is stored in a corresponding one of the data storage facilities 120. Each data storage facility 120 includes one or more disk drives or other types of storage devices. The nodes 105 of the database system are interconnected by the network 115.

As depicted in FIG. 1, a table 125 is distributed across the data storage facilities 120, where different rows of the table 125 can be distributed across the data storage facilities. In response to a request, one or more of the processing modules 110 can be instructed to retrieve corresponding rows from the table 125 to provide a result to the querying client (which can be one of the client systems 140).

The node 105 also includes the parsing engine 130, which has a parser 132 and a dispatcher 134. The parser 132 receives database requests (such as those submitted by client systems 140 over a network 142) or from another source, parses each received request, and generates executable steps for the parsed query. The parser 132 includes an optimizer 136 that generates query plans (also referred to as execution plans) in response to a request, selecting the most efficient from among the plural query plans. The optimizer 136 can also produce resource estimates (e.g., time estimates or estimates of usage of various database system resources) for the query plan.

The dispatcher 134 sends the executable steps of the query plan generated by the parser 132 to one or multiple processing modules 110 in the node 105. The processing modules 110 execute the steps. If the request specifies retrieval of data from the table 125, then the retrieved data is sent back by the database system 100 to the querying client system 140 for storage or display at the client system 140 (which can be a computer, personal digital assistant, etc.). Alternatively, the request can specify a modification of the table (adding data, changing data, and/or deleting data in the table).

The dispatcher 134 includes the workload management subsystem 138 according to some embodiments. Note that parts of the workload management subsystem 138 can also be in the processing modules 110 (not depicted), since the workload management subsystem 138 also monitors execution of requests, as discussed below.

In embodiments with multiple parsing engines 130, each parsing engine can have a corresponding parser and/or workload management subsystem.

Figure 2:
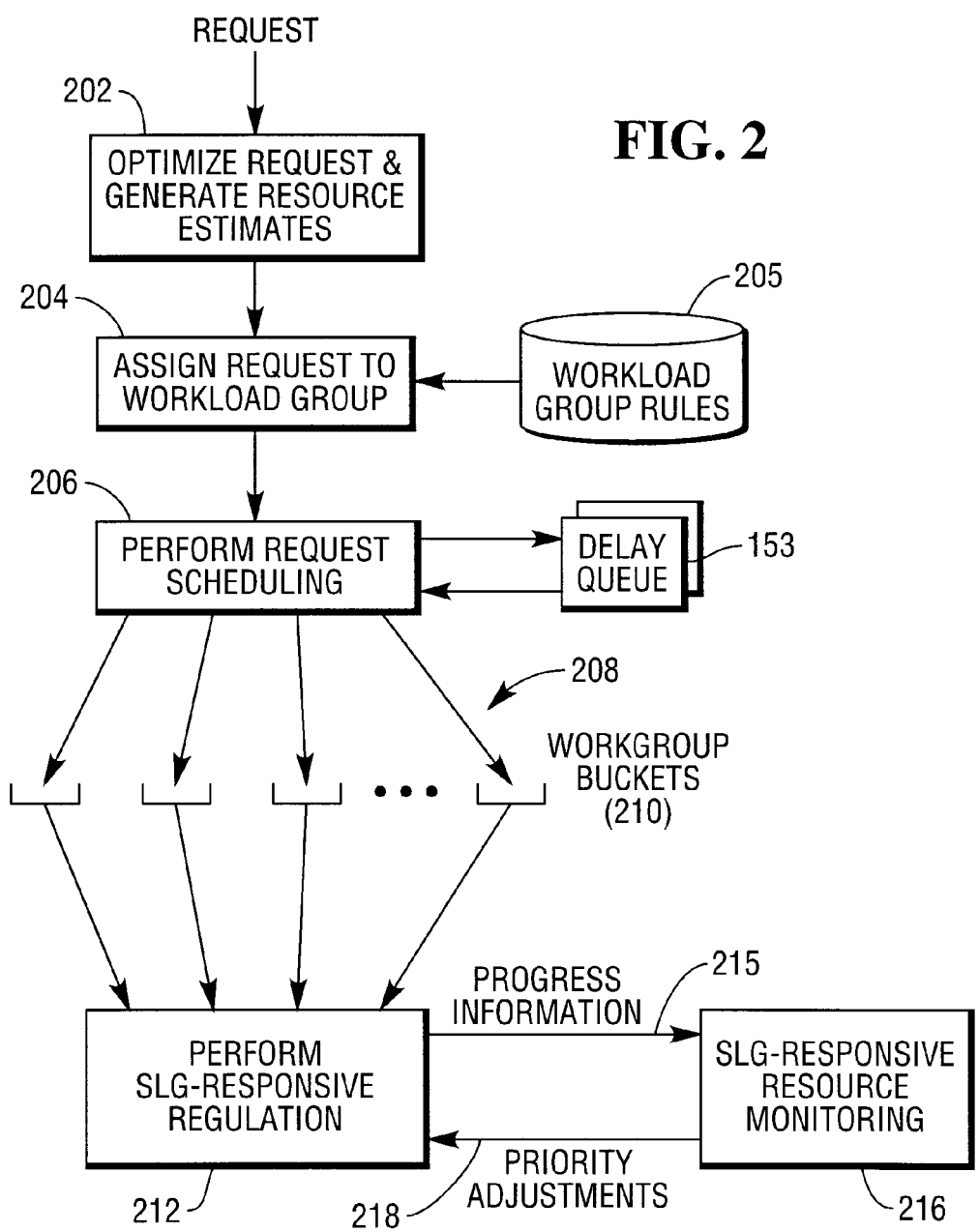
FIG. 2 illustrates an architecture for regulating workloads, in accordance with some embodiments.

Operation of the optimizer 136 and workload management subsystem 138 is illustrated in more detail in FIG. 2. In accordance with some implementations, the workload management subsystem provides a "closed-loop" workload management architecture to satisfy SLGs. The closed-loop workload management architecture is capable of supporting complex workloads and capable of self-adjusting to various types of workloads. The database system's operation has several major phases: (1) assigning incoming requests to workload groups, (2) performing dynamic scheduling to determine whether incoming requests can be scheduled for immediate execution or whether certain incoming requests are provided into the delay queue(s) 153 for later execution in an order according to dynamically calculated priority indicators; (3) monitoring the execution of the workload groups against SLGs (if applicable); and (4) regulating (adjusting and managing) the workload flow and priorities to achieve SLGs (if applicable).

As shown in FIG. 2, an incoming request is optimized (at 202) by the optimizer 136. In generating query plans and selecting an optimal one of the query plans for execution by the processing modules 110, the optimizer 136 can generate an estimate of the response time (elapsed time) that provides an indication of how long the request should execute in the database system. Note that estimates can also be generated for every individual step of the request, and a sum of the estimates for the individual steps provides the estimate of the entire request. Moreover, in accordance with some implementations, the optimizer 136 can generate other resource estimates, including estimates of processor usage, input/output (I/O) resource usage, network resource usage, and memory resource usage for each step of the request.

The estimate of usage of the processor resource can indicate the expected number of cycles of one or more CPUs that execution of a request is expected to consume. The estimate of usage of the I/O resource can indicate the expected number of I/O accesses (e.g., read or write accesses of disk storage, for example) that execution of the request is expected to invoke. The estimate of usage of the network resource can indicate an amount of network traffic (such as traffic between different computer nodes) that is expected in the execution of the request. The estimate of usage of memory can indicate am amount of memory to be used for storing data.

The optimizer 136 can also provide cardinality estimates. A cardinality estimate refers to an estimate of a size (e.g., number of rows) of a base table or a result table (that contains results of a database operation). Another resource estimate that can be provided by the optimizer is a spool size estimate regarding an estimated size of a spool, which is an intermediate table to store intermediate results during database operations.

The optimizer 136 can produce the estimates of processor usage, I/O usage, network usage, and memory usage based on a cost model. For example, the optimizer 136 can retrieve information relating to the processor capacity, which can be expressed in terms of millions of instructions per second (MIPS). Also, the optimizer 136, as part of its normal optimization tasks, can estimate the cardinalities of tables and intermediate spool files that are involved in execution of the request. Based on the estimated cardinalities and the processor capacity, the optimizer 136 is able to estimate the processor usage that is expected for execution of the request. The processor usage estimate can be performed on a per-step basis for each step of the query plan. Note that different steps can access different tables or different parts of tables across different access modules in the system.

Similarly, the optimizer 136 can also retrieve information regarding memory size (size of high-speed memory that can be used to temporarily store data). Based on the memory size and the expected accesses of data in base tables and intermediate tables that will be involved in each step of a query plan, the optimizer 136 is able to estimate the expected I/O usage for each step. The I/O usage includes I/O accesses of disk storage (e.g., the number of block I/Os to read from or write to a table or index).

Moreover, the optimizer 136 is able to determine which data-storage facilities 120 store data involved in the execution of the request. For each step of the query plan, the optimizer 136 is able to estimate how much inter-processor module or inter-node traffic is expected—this will allow the optimizer 136 to estimate the network usage (usage of the network 115 of FIG. 1) is expected for each step.

Based on the resource estimates (response time estimate and/or processor usage, I/O usage, network usage, memory usage, table cardinality and/or spool size estimates), and/or based on other classification criteria for a respective workload, the regulator subsystem 138 assigns (at 204) the request to one of the multiple workload groups that have been defined. The assignment is based on accessing workload group rules 205 (as defined by workload definitions) to match characteristics of the request as identified by the optimizer 136 with various workload definition rules. The workload group corresponding to the workload definition rules most closely matching the characteristics of the request is identified, where the incoming request is assigned to the identified workload group.

Next, the regulator 150 of the workload management subsystem 138 performs request scheduling (at 206), where the regulator 150 determines whether or not an incoming request is to be immediately scheduled for execution or whether the incoming request should be held for later execution. In some examples, as part of the request scheduling performed at 206, the regulator 150 can also consider concurrency limits—the maximum number of concurrent executing requests from each workload group. The regulator 150 monitors the concurrency limits of the workload groups, and if the concurrency limit of the corresponding workload group (that the incoming request is assigned to) is above a predefined threshold (which means that there are too many concurrent executing requests for this workload group), then the incoming request for that workload group waits in a delay queue 153 for later execution. In other example implementations, concurrency limits can be omitted.

The request scheduling 206 depicted in FIG. 2 employs the dynamic queuing mechanism 152 of FIG. 1 to select requests in the delay queue(s) 153 for execution according to an order based on calculated priority indicators, as discussed above. A more detailed discussion regarding the calculation of priority indicators is provided further below.

A request that is scheduled for execution (either a request that can be scheduled for immediate execution or a request that has been retrieved from a delay queue 153) is placed (at 208) by the regulator 150 into one of multiple workload group buckets 210 (as defined by corresponding workload definitions). The "buckets" 210 can be execution queues that contain requests scheduled for execution.

Next, the regulator 150 performs SLG-responsive regulation (at 212) at the request level. The regulator 150 selects a request from one of the buckets 210, in an order determined by priorities associated with the workload groups, and executes the selected request.

In accordance with some implementations, the SLG-responsive regulation task 212 performed by the regulator 150 includes adjusting priority settings for an individual request to allow a request to meet its respective SLG. In other implementations, the SLG-responsive regulation task 212 is also able to recalibrate resource estimates. Initial estimates are provided by the optimizer 136 as part of its optimization tasks. During execution of a request, the regulator 150 can determine that the resource estimates from the optimizer 136 are no longer accurate, in which case the regulator 150 is able to adjust the resource estimates based on the monitored progress of the execution of the request.

The resource estimates can be adjusted (on a continual basis) during execution of various steps of an execution plan corresponding to the request.

As depicted in FIG. 2, an SLG-responsive resource monitor 216 includes a regulator feedback detection and adjustment mechanism that performs feedback detection and dynamic resource adjustment. The SLG-responsive resource monitor 216 receives progress information (215) from the SLG-response regulation task 212, where the progress information 215 is reported based on monitoring execution of the request.

The SLG-responsive resource monitor 216 is able to consider, at each step of the execution plan associated with the request, whether the progress information for execution of the request so far that is received from the SLG-responsive regulation task 212 is consistent with the current resource estimates provided for the respective steps of the query plan. The progress information 215 can indicate whether or not the current resource estimates are inadequate (actual usage exceeds estimated resource usage) or excessive (actual usage less than estimated resource usage). If recalibration of resource estimates is needed based on comparing the progress information 215 to the current resource estimates, recalibration of the resource estimates can be performed.

Based on the re-calibrated resource estimates, the SLG-responsive resource monitor 216 can provide priority adjustments (218) to the SLG-responsive regulation task 212. In response to the priority adjustments (218), the SLG-responsive regulation task 212 adjusts priority settings accordingly to adjust priority settings for the remaining steps of the execution plan.

As noted above, requests in a delay queue 153 are sorted according to calculated priority indicators. The priority indicators can be calculated based on delay times and predefined priority levels for respective requests in the delay queue 153. The calculation of the priority indicators for requests in the delay queue 153 is explained in the context of FIG. 4.

FIG. 4 illustrates classification (404) of incoming requests (402) into different workload groups (represented by WD1, WD2, WD3, WD4, WD5, and WD6 in the example of FIG. 4). The classification (404) is performed as part of step 204 in FIG. 2.

In the example of FIG. 4, certain ones of the workload groups (namely WD1 and WD2) are associated with SLGs, while remaining ones of the workload groups (namely WD3, WD4, WD5, and WD6) are not associated with SLGs. The requests in workload groups WD3-WD6 are timeshare requests, while the requests in workload groups WD1 and WD2 are preemptive requests.

FIG. 4 also depicts pre-assigned priority values for the respective workload groups. For a preemptive request, the pre-assigned priority value is in the form of a pecking order (e.g., 1 and 2 for WD1 and WD2, respectively). On the other hand, the pre-assigned priority value for a timeshare request is a deterministic value (e.g., D1-D4 for respective workload groups WD3-WD6 in FIG. 4).

In some embodiments, the calculation of priority indicators for preemptive requests is different from the calculation of priority indicators for timeshare requests.

In some implementations, the priority indicator (represented as "Query Priority" in the example equations below) calculated for each preemptive request (in the delay queue 153A, for example) can be as follows:

$$\text{Urgency Factor}=(\text{Delay Time}+\text{Estimated Execution Time}/\text{Service Level Goal}),$$

$$\text{Query Priority}=\text{Delay Time}*\text{Urgency Factor}/\text{Pecking Order},$$

where:

Delay Time includes an elapsed time since of a request in the delay queue,

Estimated Execution Time is the optimizer's estimated plan execution time,

Service Level Goal is a specified time limit for completing execution of the request, and Pecking Order is a user-specified order of priority.

A higher value of Query Priority indicates a higher priority. In other examples, if Pecking Order is provided as a dividend rather than a divisor, then a lower value of Query Priority would indicate a higher priority.

Thus, as depicted above, the calculation of a priority indicator for a preemptive request in the delay queue 153A is based on the delay time associated with the request in the delay queue 153A, as well as based on SLG and pecking order information, which can be individually or collectively considered a predefined priority level. By calculating the priority indicator for a request in the delay queue 153A that takes into account a predefined priority level as well as the delay time of the request, the scheduling of requests in the delay queue 153A for execution is more likely to result in the request being able to meet their respective SLGs.

The priority indicators ("Query Priority") for timeshare requests (in the delay queue 153B, for example) can be calculated according to the following:

$$\text{Query Priority}=\text{Delay Time}/\text{DetLev},$$

where DetLev represents the deterministic level (e.g., D1-D4 in FIG. 4) that is pre-assigned to a respective timeshare request. A higher value of Query Priority indicates a higher priority. In other examples, if DetLev is provided as a dividend rather than a divisor, then a lower value of Query Priority would indicate a higher priority.

The following provides more specific examples of calculating priority indicators for preemptive requests. Assuming there are five preemptive requests (Delayed Request #1, Delayed Request #2, Delayed Request #3, Delayed Request #4, Delayed Request #5) in the delay queue 153A, the following provides an example of calculation of priority indicators for these five requests:

Delayed Request #1: request whose SLG is in some jeopardy
Delay Time=50,000
Estimated Execution Time=20,000
SLG=100,000
Urgency Factor=0.70

Pecking Order=1
Query Priority=(0.70*50,000=35,000/1)=35,000.

Delayed Request #2: request whose SLG is in serious jeopardy
Delay Time=80,000
Estimated Execution Time=40,000
SLG=100,000
Urgency Factor=1.2
Pecking Order=1
Query Priority=(1.2*80,000=96,000/1)=96,000.

Delayed Request #3: request whose SLG is in no danger
Delay Time=5,000
Estimated Execution Time=5,000
SLG=100,000
Urgency Factor=0.1
Pecking Order=1
Query Priority=(0.1*5,000=500/1)=500.

Delayed Request #4: request with SLG whose delay time is relatively short
Delay Time=5,000
Estimated Execution Time=10,000
SLG=40,000
Urgency Factor=0.38
Pecking Order=3
Query Priority=(0.38*5,000=1,875.00/3)=625.

Delayed Request #5: request with SLG whose delay time is relatively long
Delay Time=90,000
Estimated Execution Time=40,000
SLG=100,000
Urgency Factor=1.3
Pecking Order=3
Query Priority=(1.0*90,000=117,000/3)=39,000.

Based on the foregoing priority indicators calculated for the five requests, the order of priority of the delayed requests is as follows (from highest priority to lowest priority): Delayed Request #2, Delayed Request #5, Delayed Request #1, Delayed Request #4, and Delayed Request #3. This is the order in which the five requests will be extracted from the delay queue 153A for execution.

In addition to providing more intelligent prioritization of requests in one or more delay queues (e.g., 153A and 153B in FIG. 3), the workload management subsystem 138 according to some implementations is also configured to provide the concept of "soft throttles," which allows for a request with a lower priority in the queue to be selected for execution if such lower priority requests shares substantial resources with another request that has the highest priority. Substantial sharing of resources refers to sharing of resources by greater than some predefined amount. For example, two requests can perform synchronized scanning of the same base table(s). If the base table is a relatively large table, then sharing the scanning of the same table by the multiple requests can result in substantial savings, since one set of I/O operations is performed to scan the base table for the multiple different requests. If the degree of overlap of scanning is greater than some predefined threshold (e.g., the number of rows of the base table scanned by the multiple requests is greater than some predefined threshold), then the soft throttling applies and the workload management subsystem 138 can select a lower priority request in the delay queue to be executed concurrently with the highest priority request in the delay queue.

Note that the soft throttling mechanism does not change the priority or ordering of the requests within the delay queue. The soft throttling mechanism merely specifies that if the next request taken from the delay queue (the one with the highest priority) shares usage of resources with another lower priority request in the delay queue by greater than some predefined threshold, then the lower priority request in the delay queue can also be selected for execution from the delay queue.

By using the workload management subsystem 138 according to some embodiments that provides for more intelligent prioritization and scheduling of requests in a delay queue, database system operations can be enhanced since it is more likely that requests in the delay queue will be able to meet their respective SLGs. Also, sharing of system resources can be enhanced.

Instructions of machine-readable instructions, such as the workload management subsystem 138 and other modules depicted in FIG. 1, are loaded for execution on a processor. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method for use in a database system, comprising:
receiving, in the database system including at least one processor, requests to be executed in the database system;
providing, in the database system, a plurality of the requests in at least one queue, the plurality of the requests including preemptive requests and timeshare requests;
calculating, in the database system, first priority indicators for assignment to corresponding ones of the preemptive requests in the at least one queue, wherein the first priority indicators are calculated based on delay times, estimated execution times, and predefined priority levels of corresponding ones of the preemptive requests;
calculating, in the database system, second priority indicators for assignment to corresponding ones of the timeshare requests, wherein the second priority indicators are calculated in a different manner from the first priority indicators and are based on delay times and predefined priority levels of corresponding ones of the timeshare requests;

executing the plurality of the requests from the at least one queue in an order according to the calculated first and second priority indicators, wherein executing the timeshare requests comprises:

selecting, based on the calculated second priority indicators, a highest priority one of the timeshare requests for execution; and selecting another of the timeshare requests to execute with the selected highest priority timeshare request, wherein selecting the another timeshare request is based on a determination that the another timeshare request shares resources by greater than some predefined amount with the selected highest priority timeshare request;

monitoring, in the database system, progress of execution of a particular one of the plurality of the requests;

adjusting, in the database system, resource estimates for the particular request based on the monitored progress, wherein the resource estimates include estimates of usage of at least one resource in the database system; and based on the adjusted resource estimates, adjusting, in the database system, a priority setting of the particular request to affect the execution of the particular request.

2. The method of claim 1, wherein each of the delay times includes an amount of time waiting in the at least one queue by a corresponding one of the plurality of the requests.

3. The method of claim 1, wherein the first priority indicators are calculated further based on service level goals of respective ones of the preemptive requests.

4. The method of claim 3, wherein the preemptive requests have higher priorities than the timeshare requests.

5. The method of claim 1, wherein the timeshare requests share resources of the database system according to the predefined priority levels assigned to corresponding ones of the timeshare requests.

6. The method of claim 1, further comprising:
providing the preemptive requests in a first queue;
providing the timeshare requests in a second queue.

7. The method of claim 1, wherein executing the timeshare requests and the preemptive requests comprises executing the timeshare requests using resources of the database system not used by the preemptive requests.

8. The method of claim 1, wherein the resource estimates include estimates of usage of one or more of the at least one processor, an input/output resource, a network resource, and a memory resource.

9. The method of claim 1, further comprising:
assigning the received requests to respective workload groups based on matching characteristics of the requests with workload group rules,
wherein the workload groups are associated with respective different ones of the predefined priority levels.

10. A database system comprising:
at least one processor;
at least one delay queue;
a workload management subsystem executable on the at least one processor to:
provide delayed requests in the at least one delay queue, the delayed requests including preemptive requests and timeshare requests;
calculate, based on delay times, execution times, and predefined priority levels of the respective preemptive requests, first priority indicators for corresponding ones of the preemptive requests, wherein the predefined priority levels include service level goals of corresponding ones of the preemptive requests; calculate, based on delay times and predefined priority levels of the respective timeshare requests, second priority indicators for corresponding ones of the timeshare requests, the second priority indicators calculated in a different manner from the first priority indicators;

schedule, for execution, the delayed requests in the at least one delay queue according to an order defined by the calculated first and second priority indicators, wherein scheduling of the timeshare requests comprises:

selecting, based on the second priority indicators, a highest priority one of the timeshare requests for execution; and selecting another of the timeshare requests to execute with the selected highest priority timeshare request, wherein selecting the another timeshare request is based on a determination that the another timeshare request shares resources by greater than some predefined amount with the selected highest priority timeshare request wherein the workload management subsystem includes a regulator to:

monitor progress of execution of a particular one of the delayed requests;

adjust resource estimates for the particular delayed request based on the monitored progress, wherein the resource estimates include estimates of usage of at least one resource in the database system; and based on the adjusted resource estimates, adjust a priority setting of the particular delayed request to allow the particular delayed request to satisfy the corresponding service level goal.

11. The database system of claim 10, wherein the predefined priority levels for the timeshare requests include values that specify respective amounts of sharing of resources of the database system by corresponding ones of the timeshare requests.

12. The database system of claim 10, wherein the at least one delay queue includes a first delay queue to store the preemptive requests, and a second delay queue to store the timeshare requests.

13. The database system of claim 10, wherein the resource estimates include estimates of usage of one or more of the at least one processor, an input/output resource, a network resource, and a memory resource.

14. An article comprising at least one non-transitory machine-readable storage medium storing instructions that upon execution cause a database system having at least one processor to:

receive requests to be executed in the database system;
provide a plurality of the requests in at least one queue, the plurality of the requests including preemptive requests and timeshare requests;
calculate first priority indicators for assignment to corresponding ones of the preemptive requests in the at least one queue, wherein the first priority indicators are calculated based on delay times, execution times, and predefined priority levels of corresponding ones of the preemptive requests;
calculate second priority indicators for assignment to corresponding ones of the timeshare requests, wherein the second priority indicators are calculated in a different manner from the first priority indicators and are based on delay times and predefined priority levels of corresponding ones of the timeshare requests;
execute the plurality of the requests from the at least one queue in an order according to the calculated first and second priority indicators, wherein executing the timeshare requests comprises:

selecting, based on the calculated second priority indicators, a highest priority one of the timeshare requests for execution; and selecting another of the timeshare requests to execute with the selected highest priority timeshare request, wherein selecting the another timeshare request is based on a determination that the another timeshare request shares resources by greater than some predefined amount with the selected highest priority timeshare request;

monitor progress of execution of a particular one of the plurality of the requests;

adjust resource estimates for the particular request based on the monitored progress, wherein the resource estimates include estimates of usage of at least one resource in the database system; and based on the adjusted resource estimates, adjust a priority setting of the particular request to affect the execution of the particular request.

15. The article of claim 14, wherein each of the delay times includes an amount of time waiting in the at least one queue by a corresponding one of the plurality of the requests.

16. The article of claim 15, wherein the predefined priority levels include service level goals or deterministic values specifying corresponding relative sharing of database system resources.

17. The article of claim 14, wherein the resource estimates include estimates of usage of one or more of the at least one processor, an input/output resource, a network resource, and a memory resource.

* * * * *